(12) United States Patent
Cheng et al.

(10) Patent No.: US 11,616,301 B2
(45) Date of Patent: Mar. 28, 2023

(54) ANTENNA STRUCTURE

(71) Applicant: ARCADYAN TECHNOLOGY CORPORATION, Hsinchu (TW)

(72) Inventors: Shih-Chieh Cheng, Hsinchu (TW); Shin-Lung Kuo, Hsinchu (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 42 days.

(21) Appl. No.: 17/372,235

(22) Filed: Jul. 9, 2021

(65) Prior Publication Data

US 2022/0173514 A1 Jun. 2, 2022

(30) Foreign Application Priority Data

Nov. 30, 2020 (TW) .................................. 109142103

(51) Int. Cl.
*H01Q 5/50* (2015.01)
*H01Q 9/04* (2006.01)
*H04W 84/12* (2009.01)

(52) U.S. Cl.
CPC ............. *H01Q 9/0407* (2013.01); *H01Q 5/50* (2015.01); *H04W 84/12* (2013.01)

(58) Field of Classification Search
CPC ...... H01Q 1/243; H01Q 1/38; H01Q 5/30–50; H01Q 9/0407
See application file for complete search history.

(56) References Cited

U.S. PATENT DOCUMENTS

| 9,002,262 | B1* | 4/2015 | Kuo | ........................ | H01Q 5/378 |
| | | | | | 455/39 |
| 9,973,232 | B1* | 5/2018 | Kuo | .......................... | H04B 1/50 |
| 2002/0180650 | A1* | 12/2002 | Pankinaho | ............. | H01Q 5/364 |
| | | | | | 343/702 |
| 2020/0411994 | A1* | 12/2020 | Chen | .................... | H01Q 9/0407 |

* cited by examiner

*Primary Examiner* — Hasan Islam
(74) *Attorney, Agent, or Firm* — Lin & Associates Intellectual Property, Inc.

(57) ABSTRACT

An antenna structure is provided, including a substrate, an impedance control line, a first impedance control area, and a metal element. The impedance control line is located on the first side of the substrate. The first impedance control area is arranged on the substrate, located on one side of the impedance control line, close to the second end of the impedance control line, and separated from the impedance control line by a first hollow part. The metal element is arranged on the substrate and connected to the first end and the second end of the impedance control line, and the first impedance control area. As such, the present invention controls the impedance in the high frequency range between 5.85 and 7.25 GHz through the impedance control line and the first impedance control area, provides a complete current flow area, and improves the impedance control effect, efficiency, and gain.

13 Claims, 5 Drawing Sheets

ANTENNA STRUCTURE

CROSS-REFERENCE TO RELATED APPLICATION

This application claims the priority of Taiwanese patent application No. 109142103, filed on Nov. 30, 2020, which is incorporated herewith by reference.

BACKGROUND OF THE INVENTION

1. Field of the Invention

The present invention relates generally to an antenna structure, and more particularly, to an antenna structure for high frequency range.

2. The Prior Arts

The sixth-generation Wi-Fi 6 (also known as 802.11 ax) provides faster speed, lower latency and higher device density, and will be an excellent choice for indoor network access, such as: Stadiums, transportation stations, business districts, concert halls. Generally, Wi-Fi 6 uses low frequency bands such as 2.4 GHz and 5 GHz, while Wi-Fi 6E uses high frequency bands above 6 GHz.

The conventional antenna structure is mainly designed for use in Wi-Fi 6 products, and is suitable for application in low frequency bands such as 2.4 GHz and 5 GHz, and uses a substrate of FR-4 and other inexpensive materials.

However, when the conventional antenna structure is used in a high frequency range above 6 GHz, the signal is easy to lose, and the efficiency, gain, and radiation pattern do not meet the requirements, and it is not suitable for installation on Wi-Fi 6E products.

The above problems can be solved by using substrates designed specifically for high-frequency circuit materials such as Rogers series. However, the Rogers series substrates are expensive, which increases the cost.

SUMMARY OF THE INVENTION

A primary objective of the present invention is to provide an antenna structure, which can provide a complete current flow area through the configuration of the structure, improve the impedance control effect, efficiency and gain, and the omnidirectional radiation pattern of the XZ plane is quite uniform, reducing the signal loss rate of the high frequency range.

Another objective of the present invention is to provide an antenna structure, and the material of the substrate can be selected from FR-4 and other inexpensive materials to reduce the cost.

A further objective of the present invention is to provide an antenna structure that can be applied in a high frequency range between 5.85 GHz and 7.25 GHz with a small volume, which is suitable for installation on Wi-Fi 6E products.

To achieve the foregoing objectives, the present invention provides an antenna structure comprising a substrate, an impedance control line, a first impedance control area, and a metal element.

The two sides of the substrate in the width direction are respectively defined as a first side and a second side, and the two ends of the substrate in the length direction are respectively defined as a first end and a second end.

The impedance control line is located on the first side of the substrate, with its length direction parallel to the length direction of the substrate, and its two ends respectively defined as a first end and a second end. The first end of the impedance control line is close to the first end of the substrate, the second end of the impedance control line is close to the second end of the substrate.

The first impedance control area is arranged on the substrate, located on one side of the impedance control line and close to the second end of the impedance control line, with its length direction parallel to the length direction of the substrate, and a first hollow part exists between the first impedance control area and the impedance control line.

The metal element is arranged on the substrate and connected to the first end of the impedance control line, the second end of the impedance control line and one end of the first impedance control area. In the following description of this specification, λ is the wavelength of the frequency band of operation.

The first impedance control area is arranged on the substrate, located on one side of the impedance control line and close to the second end of the impedance control line, with length direction parallel to the length direction of the substrate, and a first hollow part exists between the first impedance control area and the impedance control line.

The metal element is arranged on the substrate and connected to the first end of the impedance control line, the second end of the impedance control line and one end of the first impedance control area.

Preferably, the length of the impedance control line is between $$\frac{\lambda}{2}\lambda/2$$

and λ/4.

Preferably, the width of the impedance control line is 0.5 mm.

Preferably, the length of the first impedance control area is between $$\frac{\lambda}{2}\lambda/8$$

and λ/16.

Preferably, the distance between the first impedance control area and the impedance control line is $$\frac{\lambda}{2}\lambda/20.$$

Preferably, the antenna structure further includes a second impedance control area, arranged close to the corner between the second side and the second end of the substrate, and is separated from the metal element by a second hollow part.

Preferably, the distance between the second impedance control area and the metal element is $$\frac{\lambda}{2}\lambda/20$$

multiplied by 1.5.

Preferably, the second impedance control area is L-shaped.

Preferably, the antenna structure further includes a third hollow part, the third hollow part is close to the corner between the first end of the substrate and the second side of the substrate, and the metal element surrounds the third hollow part.

Preferably, the antenna structure further comprises a second impedance control area and a third hollow part, the second impedance control area is close to the corner between the second side of the substrate and the second end of the substrate, the second impedance control area is L-shaped, and the third hollow part is close to the corner between the first end of the substrate and the second side of the substrate; wherein, the metal element comprises a first piece, and the first piece comprises a trapezoidal part and a rectangle part; the trapezoidal part includes an upper base, a lower base, a vertical side and a hypotenuse; the upper base is parallel to the lower base and overlaps the first side of the substrate, the vertical side overlaps the second end of the substrate and is perpendicular to the upper base and the lower bottom, the hypotenuse is located on the opposite side of the vertical side and is inclined with respect to the upper and lower bases, and the hypotenuse connects the second end of the impedance control line and one end of the first impedance control area; the rectangular part extends from the side of the hypotenuse near the lower base towards the second side of the substrate, the second impedance control area and the lower base are separated by the second hollow part, and the distance between the second impedance control area and the lower base is $\lambda/_{20}$ multiplied by 1.5; and wherein, the metal element comprises a second piece, the second piece comprises a shunt part, a low frequency part, a high frequency part and a confluence part, the shunt part is connected to the first end of the impedance control line, one end of the low frequency part and one end of the high frequency part; the low frequency part is located between the first end of the substrate and the third hollow part and between the second side of the substrate and the third hollow part; the high frequency part is located between the first hollow part and the third hollow part; the confluence part connects the other end of the low frequency part and the other end of the high frequency part and is close to the rectangular part; the second impedance control area and the confluence part are separated by the second hollow part, and the distance between the second impedance control area and the confluence part is $\lambda/_{20}$ multiplied by 1.5.

To achieve the foregoing objectives, the present invention provides an antenna structure comprising a substrate, an impedance control line, a first impedance control area, a metal element, a second impedance control area, and a third hollow part.

The two sides of the substrate in the width direction are respectively defined as a first side and a second side, and the two ends of the substrate in the length direction are respectively defined as a first end and a second end.

The impedance control line is located on the first side of the substrate, with its length direction parallel to the length direction of the substrate, and its two ends respectively defined as a first end and a second end. The first end of the impedance control line is close to the first end of the substrate, the second end of the impedance control line is close to the second end of the substrate, and the length of the impedance control line is between $\lambda/2$ and $\lambda/4$.

The first impedance control area is arranged on the substrate, located on one side of the impedance control line and close to the second end of the impedance control line, with its length direction parallel to the length direction of the substrate, and a first hollow part exists between the first impedance control area and the impedance control line, the length of the first impedance control area is between $\lambda/8$ and $\lambda/16$, and the distance between the first impedance control area and the impedance control line is $\lambda/20$.

The metal element is arranged on the substrate and connected to the first end of the impedance control line, the second end of the impedance control line and one end of the first impedance control area.

The second impedance control area is arranged close to the corner between the second side and the second end of the substrate, and is separated from the metal element by a second hollow part; the distance between the second impedance control area and the metal element is $$\frac{\lambda}{2}\lambda/20.$$

multiplied by 1.5, and the second impedance control area is L-shaped.

The antenna structure further includes a third hollow part, the third hollow part is close to the corner between the first end of the substrate and the second side of the substrate, and the metal element surrounds the third hollow part.

Preferably, the width of the impedance control line is 0.5 mm.

Preferably, the metal element comprises a first piece, and the first piece comprises a trapezoidal part and a rectangle part; the trapezoidal part includes an upper base, a lower base, a vertical side and a hypotenuse; the upper base is parallel to the lower base and overlaps the first side of the substrate, the vertical side overlaps the second end of the substrate and is perpendicular to the upper base and the lower bottom, the hypotenuse is located on the opposite side of the vertical side and is inclined with respect to the upper and lower bases, and the hypotenuse connects the second end of the impedance control line and one end of the first impedance control area; the rectangular part extends from the side of the hypotenuse near the lower base towards the second side of the substrate, the second impedance control area and the lower base are separated by the second hollow part, and the distance between the second impedance control area and the lower base is $\lambda/_{20}$ multiplied by 1.5; and wherein, the metal element comprises a second piece, the second piece comprises a shunt part, a low frequency part, a high frequency part and a confluence part, the shunt part is connected to the first end of the impedance control line, one end of the low frequency part and one end of the high frequency part; the low frequency part is located between the first end of the substrate and the third hollow part and between the second side of the substrate and the third hollow part; the high frequency part is located between the first hollow part and the third hollow part; the confluence part connects the other end of the low frequency part and the other end of the high frequency part and is close to the rectangular part; the second impedance control area and the confluence part are separated by the second hollow part, and the distance between the second impedance control area and the confluence part is $\lambda/_{20}$ multiplied by 1.5.

The effect of the present invention is that the antenna structure can control the impedance in the high frequency range around 6 GHz by the inductance effect of the impedance control line, and can control the impedance in the high frequency range around 7 GHz by the inductance effect of the first impedance control area so as to provide a relatively complete flow area for the current, increase the radiation bandwidth, improve the impedance control effect, efficiency, and gain, make the omnidirectional radiation pattern of the XZ plane quite uniform, and reduce the signal loss in the high-frequency band range.

Furthermore, the antenna structure of the present invention can further improve the impedance control effect, efficiency, and gain with the assistance of the capacitance effect of the second impedance control area.

In addition, the material of the substrate can be selected from inexpensive materials such as FR-4 to reduce costs.

In addition, the antenna structure of the present invention can be applied to a high frequency range between 5.85 GHz and 7.25 GHz with a smaller volume, and is suitable for installation on Wi-Fi 6E products.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
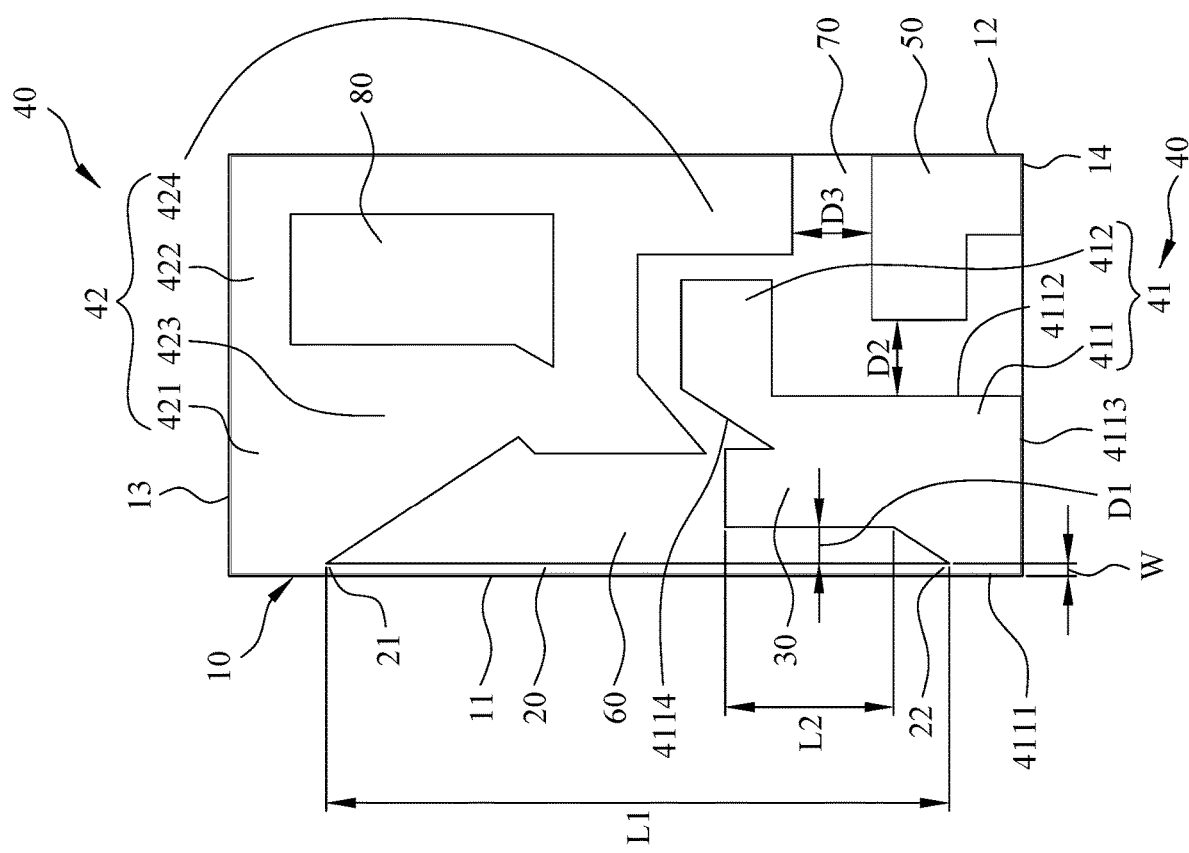
FIG. 1 is a schematic view of the antenna structure of the present invention.

Referring to FIG. 1, FIG. 1 is a schematic view of the antenna structure of the present invention. As shown in FIG. 1, the present invention provides an antenna structure comprising a substrate 10, an impedance control line 20, a first impedance control area 30, a metal element 40, a second impedance control area 50, and a third hollow part 80.

The two sides of the substrate 10 in the width direction are respectively defined as a first side 11 and a second side 12, and the two ends of the substrate 10 in the length direction are respectively defined as a first end 13 and a second end 14.

The impedance control line 20 is located on the first side 11 of the substrate 10, with its length direction parallel to the length direction of the substrate 10. In other words, the impedance control line 20 extends along the direction of the first side 11 of the substrate 10, and its two ends respectively defined as a first end 21 and a second end 22. The first end 21 of the impedance control line 20 is close to the first end 13 of the substrate 10, the second end 22 of the impedance control line 20 is close to the second end 14 of the substrate 10. Preferably, the length L1 of the impedance control line 20 is between $\lambda/2$ and $\lambda/4$, and the width W of the impedance control line 20 is 0.5 mm.

The first impedance control area 30 is arranged on the substrate 10, located on one side of the impedance control line 20 and close to the second end 22 of the impedance control line 20, with its length direction parallel to the length direction of the substrate 10, and a first hollow part 60 separates the first impedance control area 30 from the impedance control line 20, the length L2 of the first impedance control area 30 is between $\lambda/8$ and $\lambda/16$, and the distance D1 between the first impedance control area 30 and the impedance control line 20 is $\lambda/20$.

The metal element 40 is arranged on the substrate 10 and connected to the first end 21 of the impedance control line 20, the second end 22 of the impedance control line 20, and one end of the first impedance control area 30.

The second impedance control area 50 is arranged close to the corner between the second side 12 and the second end 14 of the substrate 10, and is separated from the metal element 40 by a second hollow part 70. Preferably, the distance between the second impedance control area 50 and the metal element 40 is $$\frac{\lambda}{2}\lambda/20.$$

multiplied by 1.5, and the second impedance control area 50 is L-shaped.

The third hollow part 80 is close to the corner between the first end 13 of the substrate 10 and the second side 12 of the substrate 10, and the metal element 40 surrounds the third hollow part 80.

Specifically, the metal element 40 comprises a first piece 41 and a second piece 42. The first piece 41 comprises a trapezoidal part 411 and a rectangle part 412. The trapezoidal part 411 includes an upper base 4111, a lower base 4112, a vertical side 4113, and a hypotenuse 4114; the upper base 4111 is parallel to the lower base 4112 and overlaps the first side 11 of the substrate 10, the vertical side 4113 overlaps the second end 14 of the substrate 10 and is perpendicular to the upper base 4111 and the lower bottom 4112, the hypotenuse 4114 is located on the opposite side of the vertical side 4113 and is inclined with respect to the upper base 4111 and lower base 4112, and the hypotenuse 4114 connects the second end 22 of the impedance control line 20 and one end of the first impedance control area 30. The rectangular part 412 extends from the side of the hypotenuse 4114 near the lower base 4112 towards the second side 12 of the substrate 10. The second impedance control area 50 and the lower base 4112 of the first piece 41 of the metal element 40 are separated by the second hollow part 70. Preferably, the distance D2 between the second impedance control area 50 and the lower base 4112 is $\lambda/20$ multiplied by 1.5. The second piece 42 comprises a shunt part 421, a low frequency part 422, a high frequency part 423, and a confluence part 424. The shunt part 421 is connected to the first end 21 of the impedance control line 20, one end of the low frequency part 422, and one end of the high frequency part 423. The low frequency part 422 is located between the first end 13 of the substrate 10 and the third hollow part 80, and between the second side 12 of the substrate 10 and the third hollow part 80. The high frequency part 423 is located between the first hollow part 60 and the third hollow part 80. The confluence part 424 connects the other end of the low frequency part 422 and the other end of the high frequency part 423, and is close to the rectangular part 412. The second impedance control area 50 and the confluence part 424 of the second piece 42 of the metal element 40 are separated by the second hollow part 70. Preferably, the distance D3 between the second impedance control area 50 and the confluence part 424 is λ/20 multiplied by 1.5.

Figure 2:
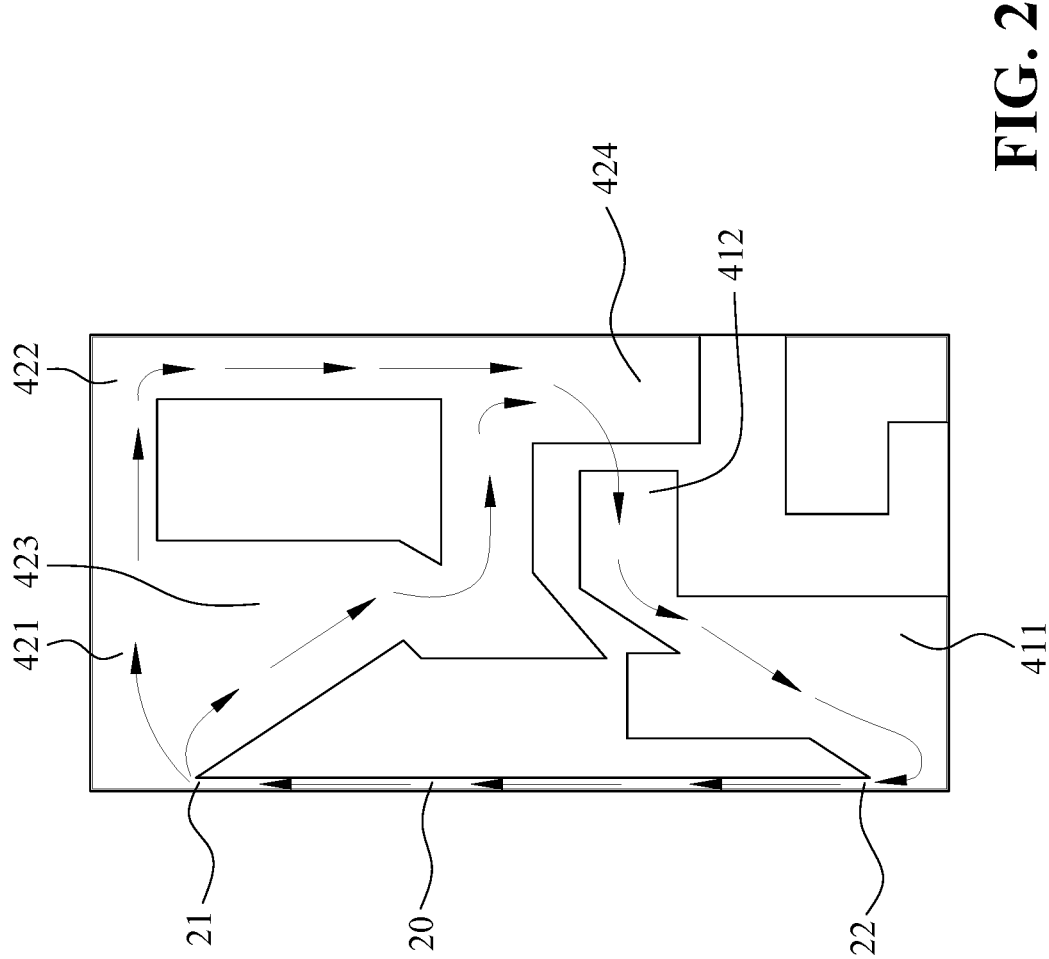
FIG. 2 is a schematic view of the current path of the antenna structure of the present invention.

Referring to FIG. 2, FIG. 2 is a schematic view of the current path of the antenna structure of the present invention. As shown in FIG. 2, the current enters the shunt part 421 along the impedance control line 20 through the first end 21 of the impedance control line 20. The current entering the shunt part 421 is divided into low-frequency current and high-frequency current. The low frequency current passes through the low frequency part 422, the high frequency current passes through the high frequency part 423, and the low frequency current and the high frequency current come together in the confluence part 424. The current collected in the confluence part 424 further passes through the rectangular portion 412 and the trapezoidal portion 411 and returns to the impedance control line 20 from the second end 22 of the impedance control line 20, and flows from the second end 22 of the impedance control line 20 to the first end 21 of the impedance control line 20 to form an annular flow path.

Figure 3:
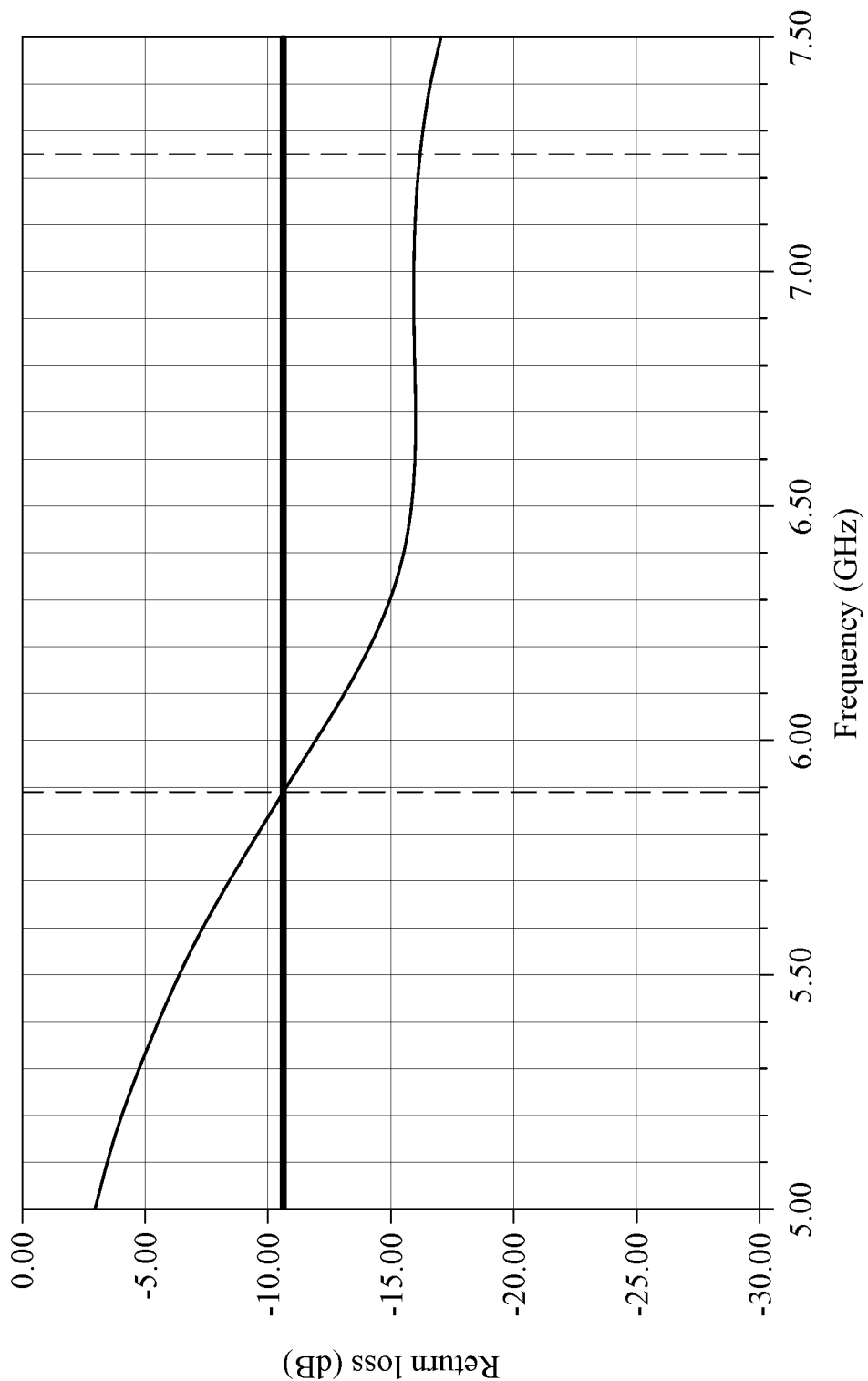
FIG. 3 is a diagram of the return loss of the antenna structure of the present invention.
Figure 4:
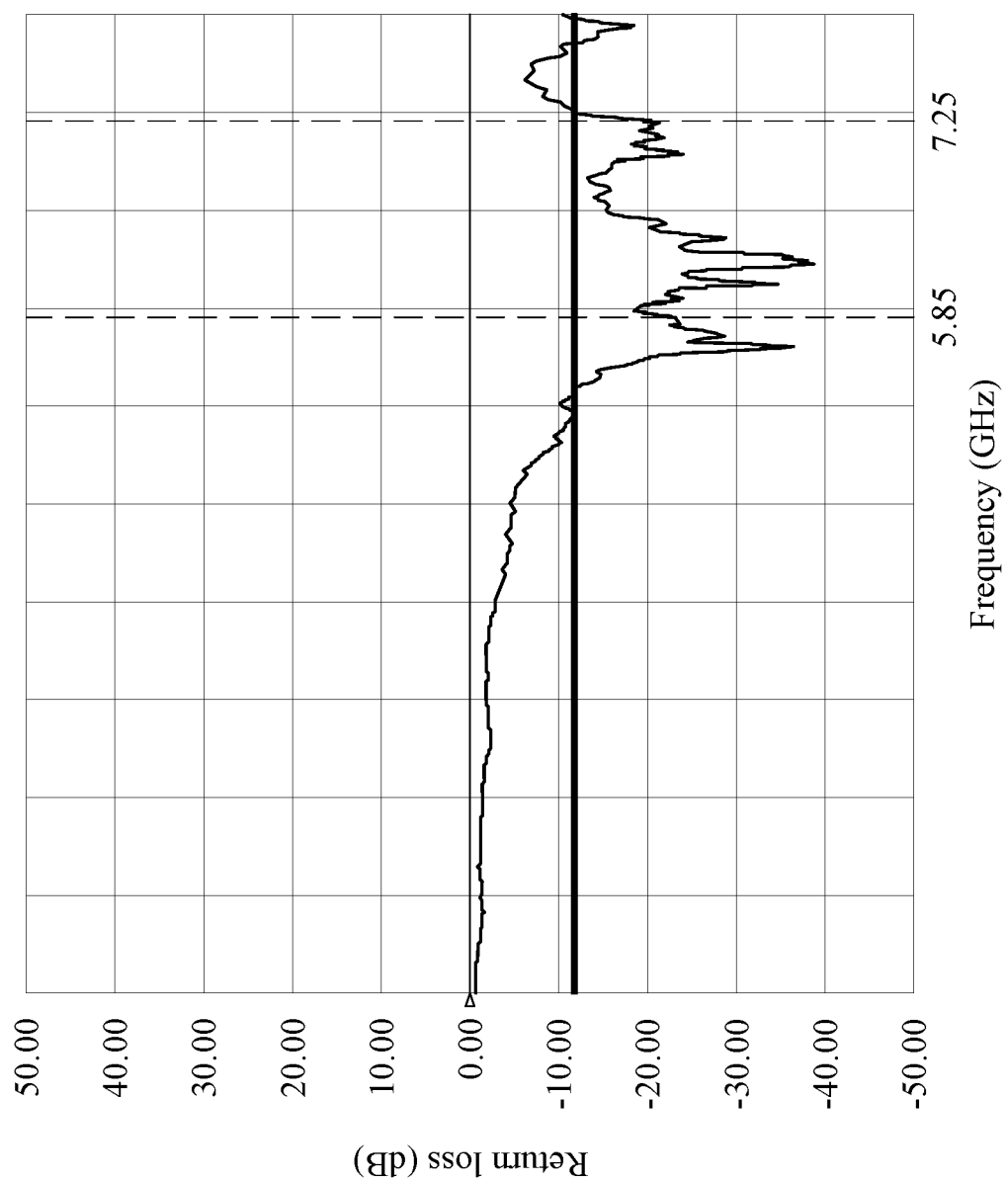
FIG. 4 is a diagram of the return loss of a product equipped with the antenna structure of the present invention.

Refer to FIG. 3 and FIG. 4. FIG. 3 is a diagram of the return loss of the antenna structure of the present invention; FIG. 4 is a diagram of the return loss of a product equipped with the antenna structure of the present invention. As shown in FIG. 3, the return loss of the antenna structure of the present invention in the high frequency range between 5.85 and 7.25 GHz is lower than −12 dB. As shown in FIG. 4, the return loss of the product equipped with the antenna structure of the present invention in the high frequency range between 5.85 GHz and 7.25 GHz is also lower than −12 dB. Therefore, the electromagnetic wave emitted by the antenna structure of the present invention in the high frequency range between 5.85 GHz and 7.25 GHz has less energy loss due to reflection.

Figure 5:
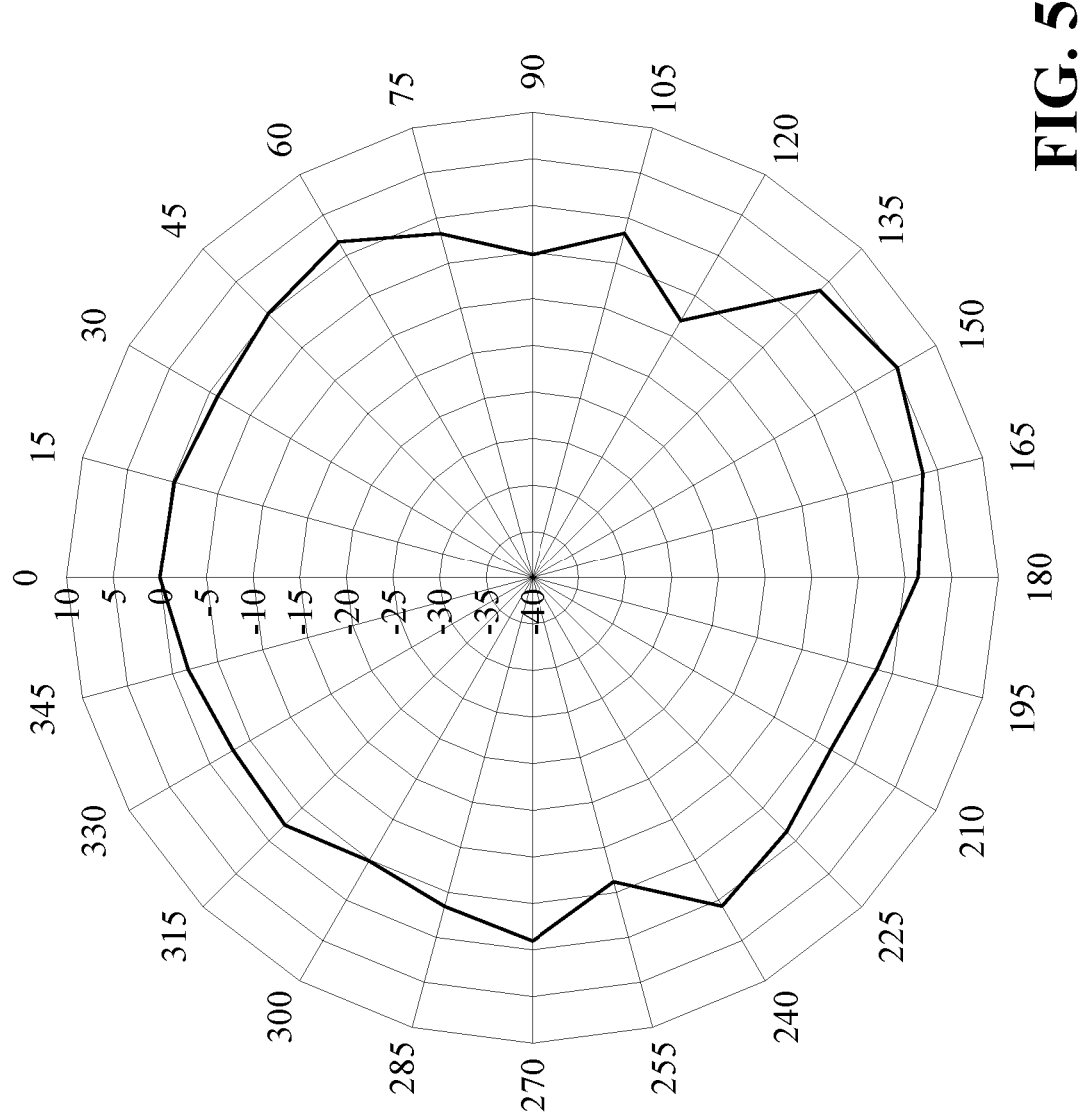
FIG. 5 is a horizontal lobe diagram of the antenna structure of the present invention.

Referring to FIG. 5, FIG. 5 is a horizontal lobe diagram of the antenna structure of the present invention. As shown in FIG. 5, the horizontal wave of the antenna structure of the present invention is very uniform, which means that the omnidirectional radiation pattern of the antenna structure of the present invention in the XZ plane is quite uniform.

The test data results of the efficiency and gain of the antenna structure of the present invention in the high frequency range between 5.85 and 7.25 GHz are shown in Table 1 below.

TABLE 1

| Frequency (MHz) | 5850 | 5950 | 6050 | 6150 | 6250 | 6350 | 6450 | 6550 |
|---|---|---|---|---|---|---|---|---|
| Efficiency (%) | 80 | 86 | 80 | 77 | 79 | 78 | 72 | 69 |
| Gain (dBi) | 4.8 | 5.6 | 5.6 | 5.2 | 5.2 | 5.1 | 5.0 | 4.9 |

| Frequency (MHz) | 6650 | 6750 | 6850 | 6950 | 7050 | 7150 | 7250 |
|---|---|---|---|---|---|---|---|
| Efficiency (%) | 68 | 60 | 66 | 66 | 66 | 64 | 64 |
| Gain (dBi) | 4.3 | 3.6 | 4.6 | 4.8 | 4.3 | 4.9 | 5.2 |

As shown in Table 1, the efficiency of the antenna structure of the present invention in the high frequency range between 5.85 and 7.25 GHz can reach 64 to 80%, and the gain can reach 3.6 to 5.6 dBi.

As such, the antenna structure of the present invention can control the impedance in the high frequency range around 6 GHz by the inductance effect of the impedance control line 20, and can control the impedance in the high frequency range around 7 GHz by the inductance effect of the first impedance control area 30 so as to provide a relatively complete flow area for the current, increase the radiation bandwidth, improve the impedance control effect, efficiency, and gain, make the omnidirectional radiation pattern of the XZ plane quite uniform. Therefore, the return loss of the antenna structure of the present invention in the high frequency range of 5.85 to 7.25 GHz is lower than −12 dB, and the return loss of the product equipped with the antenna structure of the present invention in the high-frequency frequency range between 5.85 to 7.25 GHz is also lower than −12 dB. The electromagnetic wave emitted by the antenna structure of the present invention in the high-frequency frequency range between 5.85 and 7.25 GHz has less loss when returned, thus reducing the signal loss rate in the high frequency band range.

Furthermore, the antenna structure of the present invention can provide a better inductance effect to control the impedance in the high frequency range around 6 GHz by limiting the length L1 of the impedance control line 20 to between $\lambda/2$ and $\lambda/4$ and at the same time can provide better inductance effect to control the impedance in the high frequency range around 7 GHz by limiting the relative position of the first impedance control area 30 and the impedance control line 20, limiting the distance D1 between the first impedance control area 30 and the impedance control line 20 to $\lambda/20$, and limiting the length L2 of the first impedance control area 30 to between $\lambda/8$ and $\lambda/16$. The resonance path length of the current is about between $\lambda/2$ to $1\lambda$, and the impedance control effect reaches more than 80%.

Moreover, the width of the impedance control line 20 is limited to 0.5 mm to provide better impedance control effect, efficiency and gain.

Furthermore, the antenna structure of the present invention can further improve the impedance control effect, efficiency and gain with the assistance of the capacitance effect of the second impedance control area 50.

In addition, the antenna structure of the present invention can limit the distance D2 between the second impedance control area 50 and the lower base 4112 of the metal element 40 and the distance D3 between the second impedance control area 50 and the confluence part 424 of the metal element 40 to λ/20 multiplied by 1.5, so that the impedance control effect is further improved by about 20%. Therefore, the antenna structure of the present invention has an efficiency of 64-80% and a gain of 3.6-5.6 dBi in the high frequency range between 5.85 and 7.25 GHz.

It is worth noting that the antenna structure of the present invention utilizes the configuration of the structure to provide better impedance control and reduce the signal loss rate in the high-frequency band range. Therefore, the material of the substrate 10 can be selected from inexpensive materials, such as, FR-4 materials, without using more expensive materials, such as Rogers series, so as to reduce costs.

In addition, the antenna structure of the present invention can be applied to a high frequency range between 5.85 GHz and 7.25 GHz with a smaller volume, and is suitable for installation on Wi-Fi 6E products.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An antenna structure, comprising:
   a substrate, having two sides in a width direction respectively defined as a first side and a second side, and two ends in a length direction respectively defined as a first end and a second end;
   an impedance control line, located on the first side of the substrate, with its length direction parallel to the length direction of the substrate, and two of its ends respectively defined as a first end and a second end; the first end of the impedance control line being close to the first end of the substrate, the second end of the impedance control line being close to the second end of the substrate;
   a first impedance control area, arranged on the substrate, located on one side of the impedance control line and close to the second end of the impedance control line, with its length direction parallel to the length direction of the substrate, and a first hollow part separating the first impedance control area from the impedance control line; and
   a metal element, arranged on the substrate and connected to the first end of the impedance control line, the second end of the impedance control line, and one end of the first impedance control area.

2. The antenna structure according to claim 1, wherein the length of the impedance control line is between $\lambda/2$ and $\lambda/4$, and $\lambda$ is a wavelength of a frequency band of operation.

3. The antenna structure according to claim 1, wherein the width of the impedance control line is 0.5 mm.

4. The antenna structure according to claim 1, wherein the length of the first impedance control area is between $\lambda/8$ and $\lambda/16$, and $\lambda$ is a wavelength of a frequency band of operation.

5. The antenna structure according to claim 1, wherein the distance between the first impedance control area and the impedance control line is $\lambda/20$, and $\lambda$ is a wavelength of a frequency band of operation.

6. The antenna structure according to claim 1, wherein the antenna structure further includes a second impedance control area, arranged close to a corner between the second side and the second end of the substrate, and is separated from the metal element by a second hollow part.

7. The antenna structure according to claim 6, wherein the distance between the second impedance control area and the metal element is $\lambda/20$ multiplied by 1.5, and $\lambda$ is a wavelength of a frequency band of operation.

8. The antenna structure according to claim 6, wherein the second impedance control area is L-shaped.

9. The antenna structure according to claim 1, wherein the antenna structure further includes a third hollow part, the third hollow part is close to a corner between the first end of the substrate and the second side of the substrate, and the metal element surrounds the third hollow part.

10. The antenna structure according to claim 1, wherein the antenna structure further comprises a second impedance control area and a third hollow part, the second impedance control area is close to a first corner between the second side of the substrate and the second end of the substrate, the second impedance control area is L-shaped, and the third hollow part is close to a second corner between the first end of the substrate and the second side of the substrate; wherein, the metal element comprises a first piece, and the first piece comprises a trapezoidal part and a rectangle part; the trapezoidal part includes an upper base, a lower base, a vertical side and a hypotenuse; the upper base is parallel to the lower base and overlaps the first side of the substrate, the vertical side overlaps the second end of the substrate and is perpendicular to the upper base and the lower bottom, the hypotenuse is located on the opposite side of the vertical side and is inclined with respect to the upper and lower bases, and the hypotenuse connects the second end of the impedance control line and one end of the first impedance control area; the rectangular part extends from the side of the hypotenuse near the lower base towards the second side of the substrate, the second impedance control area and the lower base are separated by the second hollow part, and the distance between the second impedance control area and the lower base is $\lambda/20$ multiplied by 1.5, $\lambda$ being a wavelength of a frequency band of operation; and wherein, the metal element comprises a second piece, the second piece comprises a shunt part, a low frequency part, a high frequency part and a confluence part, the shunt part is connected to the first end of the impedance control line, one end of the low frequency part and one end of the high frequency part; the low frequency part is located between the first end of the substrate and the third hollow part and between the second side of the substrate and the third hollow part; the high frequency part is located between the first hollow part and the third hollow part; the confluence part connects the other end of the low frequency part and the other end of the high frequency part and is close to the rectangular part; the second impedance control area and the confluence part are separated by the second hollow part, and the distance between the second impedance control area and the confluence part is $\lambda/20$ multiplied by 1.5.

11. An antenna structure, comprising:
   a substrate, having two sides in a width direction respectively defined as a first side and a second side, and two ends in a length direction respectively defined as a first end and a second end;
   an impedance control line, located on the first side of the substrate, with its length direction parallel to the length direction of the substrate, and two of its ends respectively defined as a first end and a second end; the first end of the impedance control line being close to the first end of the substrate, the second end of the impedance control line being close to the second end of the substrate, and the length of the impedance control line is between $\lambda/2$ and $\lambda/4$, $\lambda$ being a wavelength of a frequency band of operation;
   a first impedance control area, arranged on the substrate, located on one side of the impedance control line and close to the second end of the impedance control line, with its length direction parallel to the length direction of the substrate, and a first hollow part separating the first impedance control area from the impedance control line, the length of the first impedance control area being between $\lambda/8$ and $\lambda/16$, and the distance between the first impedance control area and the impedance control line being $\lambda/20$;
   a metal element, arranged on the substrate and connected to the first end of the impedance control line, the second end of the impedance control line, and one end of the first impedance control area;
   a second impedance control area, arranged close to a first corner between the second side and the second end of the substrate, and separated from the metal element by a second hollow part; the distance between the second impedance control area and the metal element being $\lambda/20$ multiplied by 1.5, and the second impedance control area being L-shaped;

a third hollow part, located close to a second corner between the first end of the substrate and the second side of the substrate, and surrounded by the metal element.

12. The antenna structure according to claim 11, wherein the width of the impedance control line is 0.5 mm.

13. The antenna structure according to claim 11, wherein the metal element comprises a first piece, and the first piece comprises a trapezoidal part and a rectangle part; the trapezoidal part includes an upper base, a lower base, a vertical side and a hypotenuse; the upper base is parallel to the lower base and overlaps the first side of the substrate, the vertical side overlaps the second end of the substrate and is perpendicular to the upper base and the lower bottom, the hypotenuse is located on the opposite side of the vertical side and is inclined with respect to the upper and lower bases, and the hypotenuse connects the second end of the impedance control line and one end of the first impedance control area; the rectangular part extends from the side of the hypotenuse near the lower base towards the second side of the substrate, the second impedance control area and the lower base are separated by the second hollow part, and the distance between the second impedance control area and the lower base is $\lambda/20$ multiplied by 1.5; and wherein, the metal element comprises a second piece, the second piece comprises a shunt part, a low frequency part, a high frequency part and a confluence part, the shunt part is connected to the first end of the impedance control line, one end of the low frequency part and one end of the high frequency part; the low frequency part is located between the first end of the substrate and the third hollow part and between the second side of the substrate and the third hollow part; the high frequency part is located between the first hollow part and the third hollow part; the confluence part connects the other end of the low frequency part and the other end of the high frequency part and is close to the rectangular part; the second impedance control area and the confluence part are separated by the second hollow part, and the distance between the second impedance control area and the confluence part is $\lambda/20$ multiplied by 1.5.

\* \* \* \* \*